(12) United States Patent
Zweigle et al.

(10) Patent No.: US 8,205,634 B2
(45) Date of Patent: Jun. 26, 2012

(54) HYDRAULIC BLOCK

(75) Inventors: Peter Zweigle, Ditzingen (DE); Klaus Schudt, Nordheim (DE); Lothar Krauter, Bietigheim-Bissingen (DE); Kurt Gensheimer, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 845 days.

(21) Appl. No.: 12/160,267

(22) PCT Filed: Aug. 27, 2007

(86) PCT No.: PCT/EP2007/058860
§ 371 (c)(1),
(2), (4) Date: Jul. 8, 2008

(87) PCT Pub. No.: WO2008/037553
PCT Pub. Date: Apr. 3, 2008

(65) Prior Publication Data
US 2009/0072181 A1    Mar. 19, 2009

(30) Foreign Application Priority Data
Sep. 25, 2006 (DE) .................. 10 2006 045 162

(51) Int. Cl.
*F16K 51/00* (2006.01)
(52) U.S. Cl. .................. 137/454.6; 137/625.65
(58) Field of Classification Search .......... 137/454.2, 137/625.65, 454.6, 625.26
See application file for complete search history.

(56) References Cited

U.S. PATENT DOCUMENTS

| | | | | |
|---|---|---|---|---|
| 1,167,027 A | * | 1/1916 | Stephenson | 137/625.26 |
| 2,257,702 A | * | 9/1941 | Murphy | 137/115.14 |
| 3,411,536 A | | 11/1968 | Tennis | |
| 4,577,653 A | * | 3/1986 | Marty | 137/119.04 |
| 6,254,199 B1 | | 7/2001 | Megerle et al. | |
| 6,371,166 B1 | * | 4/2002 | Yoshizawa et al. | 137/884 |
| 6,405,752 B1 | | 6/2002 | Fritsch et al. | |

FOREIGN PATENT DOCUMENTS

| | | |
|---|---|---|
| DE | 196 35 693 | 3/1998 |
| DE | 198 07 130 | 8/1999 |
| DE | 198 27 281 | 1/2000 |
| DE | 199 55 887 | 5/2001 |
| EP | 0 167 933 | 1/1986 |
| JP | 63-149348 | 6/1988 |
| JP | 4-82459 | 7/1992 |
| JP | 9-4734 | 1/1997 |
| JP | 9-324883 | 12/1997 |
| JP | 2001-295333 | 10/2001 |
| JP | 2002-188725 | 7/2002 |
| JP | 2003-49949 | 2/2003 |
| JP | 2005-121128 | 5/2005 |

* cited by examiner

*Primary Examiner* — John Rivell
*Assistant Examiner* — R. K. Arundale
(74) *Attorney, Agent, or Firm* — Michael J. Striker

(57) ABSTRACT

A hydraulic block (24), in particular for an automatic transmission of a motor vehicle, includes at least one valve socket (44) for accommodating a pressure control valve or switching valve (10) and a hydraulic medium at an inlet pressure on an inlet side (30). The hydraulic block (24) includes at least one annular seal (52, 54) encompassing a valve body (20, 66) in the region of the at least one valve socket (44).

5 Claims, 2 Drawing Sheets

HYDRAULIC BLOCK

CROSS-REFERENCE

The invention described and claimed hereinbelow is also described in PCT/EP2007/058860, filed on Aug. 27, 2007 and DE 10 2006 045 162.7, filed on Sep. 25, 2006. This German Patent Application, whose subject matter is incorporated here by reference, provides the basis for a claim of priority of invention under 35 U.S.C. 119 (a)-(d).

BACKGROUND OF THE INVENTION

In transmissions for motor vehicles, in particular automatic transmissions, hydraulically actuated clutches are used to shift gears. Electromagnetically actuated pressure control valves and switching valves are used to hydraulically control the shifting procedures. The need to improve transmission efficiency and driving comfort has caused the function of automatic transmissions to become continuously more complex in recent years. As a result, the number of pressure control valves and switching valves used in automatic transmissions has increased drastically. Modern automatic transmissions for motor vehicles usually contain a number of pressure control valves or switching valves, e.g. approximately eight of them.

In the manufacture of transmissions, assembly complexity dictated by the large number of valves has resulted in a trend toward integrating the pressure control valves and switching valves into an installation module. This means that the valve manufacturer mounts the valves in a shared hydraulic block and they are electrically contacted to a central plug connector by means of a pressed screen or the like. The transmission manufacturer thus has the advantage of only having to install one component, namely the hydraulic block, and hydraulically contacting it. The electrical contacting is also reduced to the contacting of the central plug connector. In order to reduce the manufacturing costs of hydraulic blocks, it is customary to embody them of plastic, preferably in the form of an injection molded plastic component.

To seal the pressure control valve and switching valve in relation to the hydraulic block, it is possible to use O-rings that are accommodated in correspondingly configured grooves in the housing of the pressure control valve or switching valve. In addition, it is possible to provide gap seals. This means that both the fitting diameter of the corresponding pressure control valve or switching valve and the receiving diameter in the hydraulic block are produced with high precision. The resulting diametrical difference is so slight that the hydraulic flow resistance in the resulting gap is sufficient to produce the seal. In addition, it is also possible to hydraulically seal the pressure control valves or switching valves by means of a production process, e.g. by means of ultrasonic welding, caulking, press-fitting, or the like. But these produce nondetachable connections, thus rendering it impossible to carry out refinishing work during production or a replacement of pressure valves and switching valves that are attached to the hydraulic block in this way.

There are also design approaches in which elastic regions, preferably made of plastic, are provided on the pressure control/switching valve and seal the connection of the pressure control valve or switching valve in relation to the hydraulic block.

DE 198 27 281 C1 has disclosed an externally actuatable directional control valve. It is provided with specially embodied sealing devices for the external or reciprocal sealing of its pressure fluid-conveying conduits. These sealing devices are inexpensive to manufacture, can be integrally formed onto the valve unit, and have particularly good elastic properties. This makes it possible to largely rule out temperature- and pressure-induced excessive strains on the sealing device and to eliminate components that require separate assembly.

DE 199 55 887 A1 relates to a solenoid valve equipped with a check valve. The solenoid valve is particularly used in slip-controlled hydraulic brake systems of motor vehicles and includes a sealing lip and elastic regions on the hydraulic connection.

DE 196 35 693 A1 has disclosed a solenoid valve for a slip-controlled hydraulic vehicle brake system. To produce a simple seal, this design proposes using a plastic end piece, which is placed onto the end surface of the valve body protruding into the receiving bore and produces a seal in relation to both the receiving bore and the valve seat part.

In the designs outlined above according to DE 198 27 281 C1 and DE 199 55 887 A1 as well as the design according to DE 196 35 693 A1, it is disadvantageous that in order to achieve a sufficient elasticity, the corresponding components must either be very thin-walled or very long. In particular, the thin-walled production makes them very difficult to manufacture. Between the elastic regions, i.e. the sealing points, a hydraulic connection in the form of a transverse conduit for the working pressure must be provided, which leads to a valve closure member. In a plastic part, the transverse conduit is implemented in the injection mold by means of a transverse slider. This transverse slider cannot be provided in the region of the elastic elements since otherwise, a demolding there is not possible. Also, an overlapping of the elastic regions in order to reduce overall length can only be implemented with difficulty. Such designs, therefore, are generally rejected when there is a small amount of available space, particularly a limited length.

SUMMARY OF THE INVENTION

The present invention proposes a hydraulic block in the wall of which at least one annularly embodied seal is provided. Preferably, the hydraulic block according to the present invention includes at least one annular seal, for example sealing lips embodied in cascading sequence with one another in the wall of the hydraulic block. The hydraulic block proposed according to the invention is preferably produced using the plastic injection molding process; its wall is embodied so that downstream of the at least one seal extending an annular fashion, a cavity, i.e. a distance from the wall of the hydraulic block, remains, which lends the at least one annular seal a high degree of elasticity. By contrast with the designs known from the prior art, the at least one annular, elastically embodied seal is no longer embodied directly on a pressure control valve or switching valve to be installed in at least one valve socket of the hydraulic block, but is instead now integrated into the wall of the hydraulic block in the region of the valve socket. Since the elastically embodied seals no longer have to be embodied on the circumference of the valve body or on the circumference of a hydraulic part of a pressure control valve or switching valve, there are no longer conflicts with regard to the production of a working pressure conduit that must be embodied transverse to the symmetry axis of the pressure control valve or switching valve, which conduit is manufactured in the injection mold by means of a transverse slider in the mold. Following the embodiment proposed according to the present invention, the at least one annular seal embodied in the wall of the hydraulic block and a transverse conduit required for conveying the working pressure of the hydraulic medium can be produced so as to enable a trouble-free demolding of the hydraulic block from the injection mold.

Another advantage that can be achieved with the embodiment for a hydraulic block proposed according to the present invention lies in the fact that the transverse conduit required for conveying the working pressure inside the hydraulic block extends in a region of the valve socket, opens into the vicinity of the at least one annular seal on the valve socket and, because of this circumstance, can be embodied as significantly larger, thus assuring a sufficient flow cross section for the hydraulic medium at working pressure. It is also advantageous that the elasticity of the at least one annular seal in the wall of the hydraulic block is provided by the material of the hydraulic block itself, which permits the reduction of the sealing diameter, i.e. a reduction of the valve socket containing the pressure control valve or switching valve. Due to this circumstance, in turn, the hydraulic forces produced, which act on the pressure control/switching valve in the axial direction and must be absorbed by a correspondingly dimensioned valve attachment, are significantly less powerful.

DETAILED DESCRIPTION OF THE PREFERRED EMBODIMENTS

Figure 1:
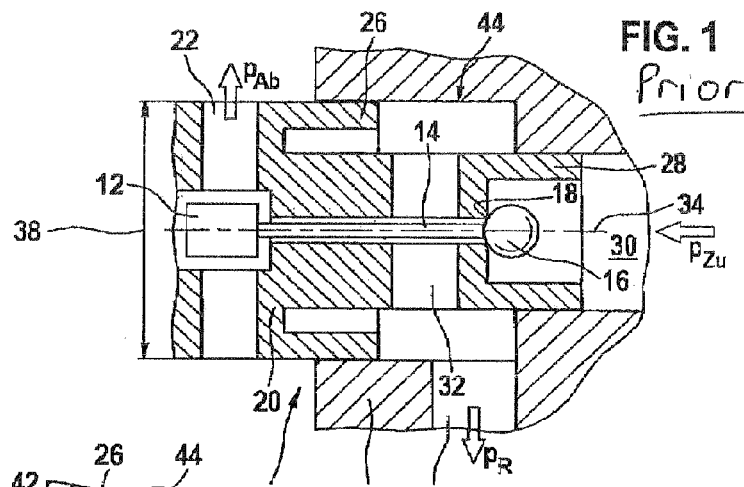
FIG. 1 shows a valve socket of a hydraulic block according to the prior art, with sealing regions embodied on the pressure valve or switching valve.

FIG. 1 shows a pressure control valve or switching valve 10, which includes a valve closure member 12 equipped with a plunger 14 via which it acts on a closure element 16 that is embodied as ball-shaped in the depiction in FIG. 1. The closure element 16 closes a closure seat 18 of a valve body 20 of the pressure control valve or switching valve 10. The valve body 20 of the pressure control valve or switching valve 10 also contains a conduit 22 that leads to a tank outlet. A hydraulic block 24 contains a valve socket 44. A first elastic sealing region 26 and a second elastic sealing region 28 are embodied on the circumference of the valve body 20 of the pressure control valve or switching valve 10. The first sealing region 26 embodied on the valve body 20 seals a working connection 36, while the second elastic sealing region 28 on the circumference of the valve body 20 seals an inlet side 30 containing a hydraulic medium at an inlet pressure. When the closure element 16 opens, hydraulic medium at the inlet pressure $p_{Zu}$ flows past from the inlet side 30 through the open closure seat 18, and into a transverse conduit 32, from which it travels into the working connection 36. The valve socket 44 in the hydraulic block 24 according to FIG. 1 is embodied in a first diameter 38. The outlet pressure of the hydraulic medium is labeled $p_{Ab}$ and the working pressure of the hydraulic medium is labeled $p_R$.

Figure 2:
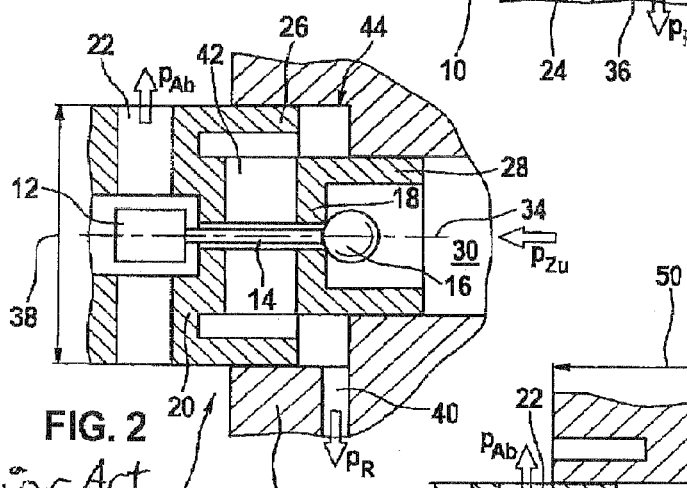
FIG. 2 shows a shortened design of a hydraulic block according to the prior art.

The depiction in FIG. 2 shows a modified embodiment of a valve socket of a hydraulic block according to the prior art, which is reduced in length.

The embodiment variant of the hydraulic block 24 known from the prior art shown in FIG. 2 is shortened in comparison to the embodiment variant shown in FIG. 1. The plunger 14 in the exemplary embodiment shown in FIG. 2 is significantly shorter than the plunger 14 in the depiction according to FIG. 1. The quick succession of the first elastic sealing region 26 and the second elastic sealing region 28 on the valve body 20 of the pressure control valve or switching valve 10 results in a relatively narrow transverse conduit 40 in the region of the valve socket 44 so that the hydraulic medium at working pressure flowing out through this transverse conduit travels at a high flow speed due to the narrow cross section. In addition, the embodiment variant according to FIG. 2 has the decisive disadvantage that a transverse conduit 42 in the valve body 20 of the pressure control/switching valve 10 is either impossible to demold or can only be demolded with great difficulty.

Figure 3:
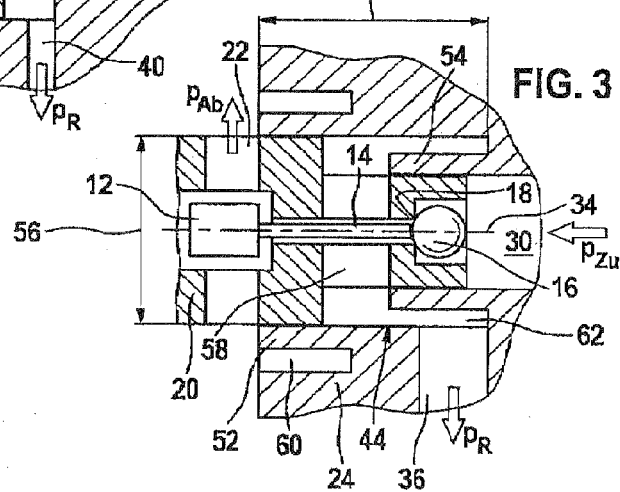
FIG. 3 shows an embodiment variant of the hydraulic block proposed according to the invention, equipped with annular seals embodied in its wall.

FIG. 3 schematically depicts the hydraulic block 24 proposed according to the present invention.

The schematic depiction in FIG. 3 shows that the valve body 20 of the pressure control valve or switching valve 10 has been placed into the valve socket 44, which by contrast with the embodiments known from the prior art shown in FIGS. 1 and 2, has a significantly reduced diameter 56 so that the resulting hydraulic forces to which the pressure control valve or switching valve 10 in the hydraulic block 24 is subjected are significantly less powerful. The symmetry axis of the pressure control valve or switching valve 10 schematically depicted in FIG. 3 is labeled with the reference numeral 34; the valve closure member is labeled with the reference numeral 12 and, via the plunger 14 that is embodied with a reduced length, acts on the closure element 16 embodied here in the form of a ball, which closes a closure seat 18 embodied in the valve body 20 of the pressure control valve or switching valve 10. FIG. 3 shows that the valve socket 44 is embodied with a reduced length 50 that essentially corresponds to a length of an annularly embodied second annular chamber 62 inside the hydraulic block 24. On its end surface, the hydraulic block 24 has a first annular seal 52 that has a greater degree of elasticity since it is backed by a first annular chamber 60 situated in the wall of the hydraulic block 24. The same is true for a second smaller-diameter, likewise annular seal 54 that is likewise embodied in the wall of the hydraulic block 24 and, inside the valve socket 44, is separated from the boundary wall of the valve socket 44 by a second annular chamber 62 extending axially inside the reduced length 50.

It is also clear from the depiction in FIG. 3 that the transverse conduit 40 for the working connection 36, which conduit is very narrow in the exemplary embodiment according to the prior art shown in FIG. 2, can be embodied with an enlarged cross section in the hydraulic block 24 proposed according to the present invention and preferably opens into the vicinity of one of the two annular seals 52, 54 shown in FIG. 3; in the exemplary embodiment according to FIG. 3, it opens into the vicinity of the second, inner annular seal 54.

The inlet side 30 of the valve body 20 of the pressure control valve or switching valve 10, embodied with a reduced diameter 56, is acted on by a hydraulic medium at the inlet pressure $p_{Zu}$, which is prevented from passing through into a demoldably embodied transverse conduit 58 in the valve body 20 by the closure element 16—which is embodied for example in the form of a ball—that has been moved into the closure seat 18. If the plunger 14 is actuated through a supply of electrical current to an electromagnet, not shown in FIG. 3, of the pressure control valve or switching valve 10, then the ball-shaped closure element 16 is moved out of the closure seat 18 so that hydraulic medium at the inlet pressure $p_{Zu}$ flows from the inlet side 30, through the opened closure seat 18, into the demoldable transverse conduit 58 and from there, overflows into the working connection 36 in accordance with the set regulating pressure. The pressure in the working connection 36 is labeled $p_R$.

Figure 4:
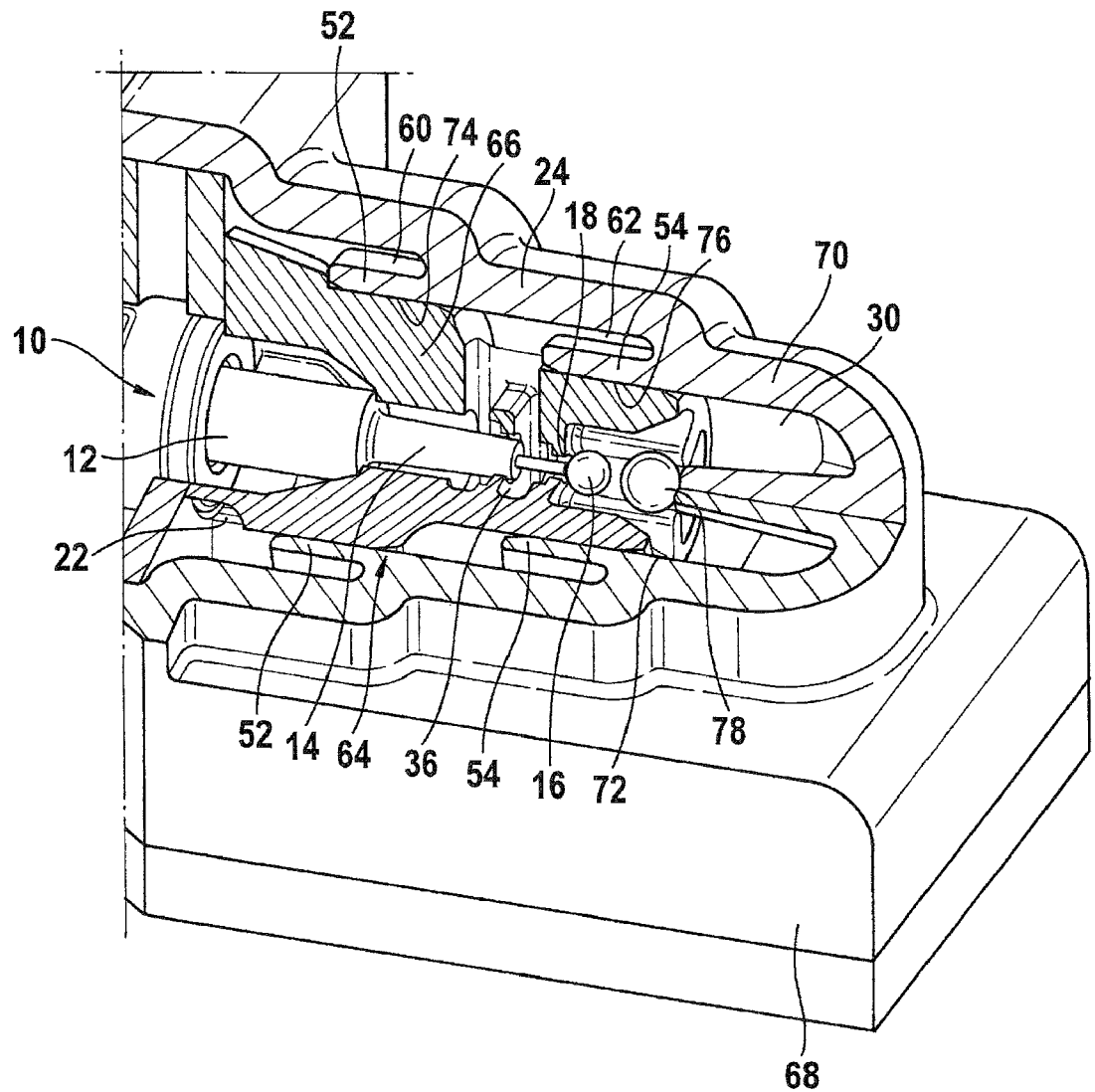
FIG. 4 is a perspective depiction of a section through a hydraulic block.

FIG. 4 is a perspective view of a section through the hydraulic block proposed according to the present invention.

The perspective depiction in FIG. 4 shows that a hydraulic part 64 of the pressure control valve or switching valve 10 is inserted with its housing 66 into the valve socket 44 of the hydraulic block 24. The hydraulic block 24 is preferably produced using the plastic injection molding technique and has a socket plate 68 from which a wall 70 extends, which is adapted to the geometry of the pressure control valve or switching valve 10. The first annular seal 52 is embodied in the region of an inside 72 of the wall 70 of the hydraulic block 24. The first annular seal 52 is separated from the wall 70 of the hydraulic block 24 by the first annular chamber 60. An additional, second annular seal 54 is embodied analogously in the wall 70 of the hydraulic block 24 and is likewise separated from the wall 70 of the hydraulic block 24 by a second annular chamber 62. The two annular chambers 60, 62 lend the annular seals 52, 54 a high degree of elasticity.

The depiction according to FIG. 4 shows that the housing 66 of the hydraulic part 64 of the pressure control valve or switching valve 10 forms a first sealing surface 74 with the first annular seal 52 and forms a second sealing surface 76 with the second likewise annular seal 54. The perspective depiction according to FIG. 4 also shows that in the housing 66 of the hydraulic part 64 of the pressure control valve or switching valve 10, a ball-shaped captive retainer 78 is provided on the inlet side and prevents a loss of the ball-shaped closure element 16 situated opposite the closure seat 18.

In addition, FIG. 4 shows that the pressure control valve or switching valve 10 includes the plunger 14 that is attached to the cylindrically embodied valve closure member 12 and that extends through the closure seat 18 to act on the closure element 16—which is depicted as ball-shaped in FIG. 4—of the pressure control valve or switching valve 10.

While the first sealing surface 74 between the first annular sealing ring 52 and the circumference of the housing 66 of the hydraulic part 64 seals the working connection 36, the second sealing surface 76 between the second annular seal 54 and the circumference of the housing 66 of the hydraulic part 64 produces a seal of the inlet side 30 of the hydraulic module 40 with regard to the prevailing inlet pressure $p_{Zu}$ of the hydraulic medium contained therein.

The hydraulic block 24 shown in FIGS. 3 and 4 advantageously permits the production of the seal by means of elastic sealing regions—in this case embodied in the form of annular seals 52, 54—without requiring an increased length and with the advantage that the diameter 56 serving as the seal is significantly reduced in comparison to the embodiment variants according to the prior art shown in FIGS. 1 and 2. Viewed as a whole, this results in a significantly lower hydraulic force acting on the pressure control valve or switching valve 10, which on the one hand, has a positive influence on its service life and on the other hand, simplifies the mechanical fastening of the pressure control valve or switching valve 10 since it permits the valve to be designed in accordance with the reduced hydraulic forces. In addition, the reduced hydraulic force acting on the pressure control valve or switching valve 10 reduces the force acting on the seal, which has a positive influence on the service life and sealing action of the seal and permits the use of less expensive sealing materials.

What is claimed is:

1. A hydraulic block (24) for an automatic transmission of a motor vehicle, comprising:
   at least one valve socket (44) for accommodating a valve body of a pressure control valve or switching valve (10) and a hydraulic medium at an inlet pressure on an inlet side (30);
   a moveable valve closure member (12) disposed in the valve body (20, 66), wherein said valve closure member (12) acts on a closure element (16), wherein the closure element (16) cooperates with a closure seat (18) formed on the valve body;
   at least one annular seal (52, 54) encompassing the valve body (20, 66) of the pressure control valve or switching valve (10) in the region of the at least one valve socket (44), wherein the at least one annular seal (52, 54) is integrated in a wall (70) of the hydraulic block (24) and has an elasticity resulting from a material of the hydraulic block (24) and at least one annular chamber (60, 62) that engages behind the at least one annular seal (52, 54), such that the at least one annular seal (52, 54) integrated in the wall (70) of the hydraulic block is disposed elastically on a circumference of the valve body and thereby forms a sealing surface (74).

2. The hydraulic block (24) as recited in claim 1, wherein the hydraulic block (24) is produced in the form of a plastic injection molded part.

3. The hydraulic block (24) as recited in claim 1, wherein the at least one valve socket (44) has a first annular seal (52) delimiting it and a second annular seal (54) situated inside the valve socket (44).

4. The hydraulic block (24) as recited in claim 3, wherein the second annular seal (54) constitutes a second sealing surface (76) with the circumference of the valve body (20) or the circumference of a housing (66) of a hydraulic part (64) of the pressure control valve or switching valve (10).

5. The hydraulic block (24) as recited in claim 3, wherein a conduit of a working connection (36) in the at least one valve socket (44) opens into the vicinity of the annular seals (52, 54).

* * * * *